United States Patent
Glavicic et al.

(10) Patent No.: US 12,488,256 B2
(45) Date of Patent: Dec. 2, 2025

(54) PREDICTIVE MODELING FOR FORGED COMPONENTS

(71) Applicant: Rolls-Royce Corporation, Indianapolis, IN (US)

(72) Inventors: Michael George Glavicic, Indianapolis, IN (US); Chong M. Cha, Indianapolis, IN (US); Weizhou Li, Indianapolis, IN (US); Sean Warrenburg, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1139 days.

(21) Appl. No.: 17/305,227

(22) Filed: Jul. 1, 2021

(65) Prior Publication Data
US 2023/0004829 A1     Jan. 5, 2023

(51) Int. Cl.
*G06N 20/20*     (2019.01)
*G01M 13/00*    (2019.01)
(Continued)

(52) U.S. Cl.
CPC .............. *G06N 5/04* (2013.01); *G01M 13/00* (2013.01); *G06N 20/00* (2019.01)

(58) Field of Classification Search
CPC ............ G06N 20/00; G06N 3/09; G06N 5/04; G06N 3/04; G06N 3/0464; G01M 13/00;
(Continued)

(56) References Cited

U.S. PATENT DOCUMENTS

| 8,775,428 B2 | 7/2014 | Birdwell et al. |
| 2010/0292966 A1* | 11/2010 | Wang ............ G06F 30/23 703/2 |

(Continued)

FOREIGN PATENT DOCUMENTS

| CN | 111916159 A | * | 11/2020 | ............. G06F 30/27 |
| CN | 112214933 A | * | 1/2021 | ............. G06F 30/27 |
| CN | 112989694 A | * | 6/2021 | ............. G06F 30/27 |

OTHER PUBLICATIONS

Lu et al., "Extraction of mechanical properties of materials through deep learning from instrumented indentation", Mar. 2020, Retrieved from https://www.pnas.org/content/117/13/7052#sec-1, 18 pgs.
Santos et al., "Machine-learning-based mechanical properties prediction in foundry production", Sep. 2009, 7 pgs.
Liu et al., "Materials discovery and design using machine learning", Sep. 2017, Journal of Materiomics, vol. 3, Issue 3, 26 pgs.

(Continued)

*Primary Examiner* — Grace Park
(74) *Attorney, Agent, or Firm* — Shumaker & Sieffert, P.A.

(57) ABSTRACT

In general, various aspects of the techniques enable predictive modeling for forged components. A computing device comprising a memory and a processor may be configured to perform the techniques. The memory may store a trained machine learning model that associates training features extracted from data representative of a plurality of training forged components to a plurality of training model results. The memory may also store data representative of a target forged component. The processor may perform a geometrical analysis with respect to the data representative of the target forged component to extract target features, and apply the trained machine learning model to the target features to obtain predicted model results for the target forged component. The processor may also output the predicted model results.

20 Claims, 6 Drawing Sheets

(51) Int. Cl.
*G06N 5/04* (2023.01)
*G06N 20/00* (2019.01)

(58) Field of Classification Search
CPC .... G06V 10/70; G06V 10/77; G06V 10/7715; G06V 10/82
See application file for complete search history.

(56) References Cited

U.S. PATENT DOCUMENTS

| | | | | |
|---|---|---|---|---|
| 2021/0132599 A1* | 5/2021 | Narayanan | ......... | G05B 23/0283 |
| 2021/0133378 A1* | 5/2021 | Kosic | ........................ | G06N 3/08 |
| 2021/0342609 A1* | 11/2021 | Smolyanskiy | ......... | G06N 3/045 |

OTHER PUBLICATIONS

"Modeling the Heat Treatment Response of P/M Components", MPI's Morris (Butch) Bookry—Powder Metallurgy Research Center, Retrieved Apr. 2021, 25 pgs.

MacKenzie, "Application of Computational Fluid Dynamics to Understand Quenching Problems", 18th Congress IFHTSE, Jul. 2010, 10 pgs.

Frank et al., " Machine-Learning Methods for Computational Science and Engineering", Mar. 2020, 35 pgs.

Wang et al., "A 3D shape descriptor based on spherical harmonics through evolutionary optimization", Feb. 2016, 9 pgs.

\* cited by examiner

PREDICTIVE MODELING FOR FORGED COMPONENTS

TECHNICAL FIELD

The present disclosure generally relates to predictive modeling for forged components.

BACKGROUND

Many industries rely on components produced via forging. Forged components are used, for example, in the automotive industry, the aviation industry, the farm equipment industry, the manufacturing industry (for machines that manufacture items), the construction industry (for machines that assist in construction), etc. Forging of components is a complicated and involved process, requiring specialized knowledge to produce components having high degrees of strength (e.g., tensile strength), heat resistance, and other properties compared to equivalent components produced via casting or machining.

In certain instances, such as hot forging, the forged component may undergo an additional quenching process in which the hot forged component is placed in a medium to facilitate cooling (or in other words heat transfer from the hot forged component to the medium). Examples of mediums may include water, oil, and air. Quenching may, for components forged from metals such as iron and steel, increase the hardness of the forged component relative to forged components that do not undergo quenching. Quenching, like forging, is a complicated and involved process that varies depending on a number of different factors (or in other words, quenching parameters), such as a size of a quenching tank, an extent of agitation, the medium used for quenching, how the quenching medium is delivered, and how the forged component is delivered into the quenching tank. Incorrect quenching may introduce distortions (e.g., cracks, warping, inconsistent hardness, etc.) that may reduce the strength and/or change the geometry of the forged product, which may potentially render the forged product unsuitable for use in production.

Rather than resort to trial and error, forges and/or forge customers may model heat transfer using computational fluid dynamics (CFD) to better understand how quenching will impact the hot forged component. CFD relies on partial differential equations (PDEs) to solve a mathematical model of how the fluid dynamics may facilitate transfer of heat from the hot forged component to the quenching medium (which may also be referred to as the "quenchant"). A mechanical finite element method (FEM) model may utilize the output of the CFD model to produce data representative of location-specific quench impacts on the hot forged component.

While modeling may reduce application of quenching that results in unsuitable forged components, such modeling may be time consuming, especially when there are a number of different potential geometries for a given forged product, each of which must be separately modeled. In addition, each forge may have different quenching configurations that very greatly between one another, which may result in each forge and/or customer having to repeat such modeling for each quenching configuration.

SUMMARY

Various aspects of the techniques described in this disclosure may enable computing devices to leverage machine learning to predict how a quenching process performed according to various quenching parameters may impact a hot forged component. The computing device may obtain a trained machine learning model that has been trained using model results output from past quench modeling of forged components having a variety of different geometries. The trained machine learning model may associate the model results to the underlying different geometries of each of the forged components. In some instances, the association learned by the trained machine learning model may involve a mapping of heat transfer coefficients to features (which may be extracted via a principal component analysis or by way of a convolutional neural network) representative of the underlying different geometries of each of the forged components.

The computing device may then obtain data representative of a target forged component design having a target geometry that differs from the geometries of the forged components used to train the machine learning model. The computing device may extract the features of the geometry of the target forged component, providing the extracted features of the target geometry for the target forged component as an input to the trained machine learning model. The trained machine learning model may, upon receiving the extracted features of the target geometry for the target forged component, identify one or more of the training forged components having a similar (e.g., a sum of differences between the extracted features for the target forged component and the extracted features for the training forged components within a set threshold) geometry or partial geometry. The trained machine learning model may then assign model results for the similar geometries (or partial geometries) for the training forged components to the target geometry (or partial target geometry) for the target forged component, thereby potentially avoiding the need to perform extensive modeling for the target forged component.

In this way, various aspects of the techniques may facilitate more efficient operation of the computing device itself. By allowing the computing device to predict model results through application of a trained machine learning model, the computing device may consume less resources (e.g., processor cycles, memory, memory bus bandwidth, and accompanying power) compared to performing a full modeling (involving computational fluid dynamics and mechanical finite element method processes) with respect to each variation of the geometry of the forged component.

Moreover, as full modeling may consume significant amounts of time, the computing device that processes target geometries for forged components using trained machine learning models may rapidly prototype different geometries and possibly identify geometries that would perform better than accepted existing geometries, leading to development of better geometries for forged components. The computing device may also identify potential geometries for forged components that should also undergo further full modeling, which may then be used to train the trained machine learning model to further improve prediction. In addition, the computing device may utilize the trained machine learning model to identify divergence in quenching processes between suppliers allowing for transfer of forged components between supplies that will result in forged components having quench distortion within required tolerances, thereby facilitating selection of suppliers.

In some examples, various aspects of the techniques are directed to a computing device comprising: a memory configured to: store a trained machine learning model that associates training features extracted from data representative of a plurality of training forged components having a respective different geometry of a plurality of geometries to a plurality of training model results representative of one or more mechanical properties generated through modeling application of a quench process to the plurality of training forged components according to quench parameters; store data representative of a target forged component having a target geometry that differs from all of the plurality of geometries for the plurality of training forged components; one or more processors configured to: perform a geometrical analysis with respect to the data representative of the target forged component to extract target features; apply the trained machine learning model to the target features to obtain predicted model results for the target forged component, the predicted model results representative of modeling application of the quench process to the data representative of the target forged component according to the quench parameters; and output the predicted model results.

In another example, various aspects of the techniques are directed to a method comprising: performing a geometrical analysis with respect to data representative of a target forged component to extract target features; applying a trained machine learning model to the target features to obtain predicted model results for the target forged component, the predicted model results representative of modeling application of a quench process to the data representative of the target forged component according to quench parameters, wherein the trained machine learning model associates training features extracted from data representative of a plurality of training forged components having a respective different geometry of a plurality of geometries to a plurality of training model results representative of one or more mechanical properties generated through modeling application of the quench process to the plurality of training forged components according to the quench parameters, and wherein the target forged component having a target geometry that differs from all of the plurality of geometries for the plurality of training forged components; and outputting the predicted model results.

In another example, various aspects of the techniques are directed to a non-transitory computer-readable storage medium having instructions stored thereon that, when executed, cause one or more processors to: perform a geometrical analysis with respect to data representative of a target forged component to extract target features; apply a trained machine learning model to the target features to obtain predicted model results for the target forged component, the predicted model results representative of modeling application of a quench process to the data representative of the target forged component according to quench parameters, wherein the trained machine learning model associates training features extracted from data representative of a plurality of training forged components having a respective different geometry of a plurality of geometries to a plurality of training model results representative of one or more mechanical properties generated through modeling application of the quench process to the plurality of training forged components according to the quench parameters, and wherein the target forged component having a target geometry that differs from all of the plurality of geometries for the plurality of training forged components; and output the predicted model results.

DETAILED DESCRIPTION

Figure 1:
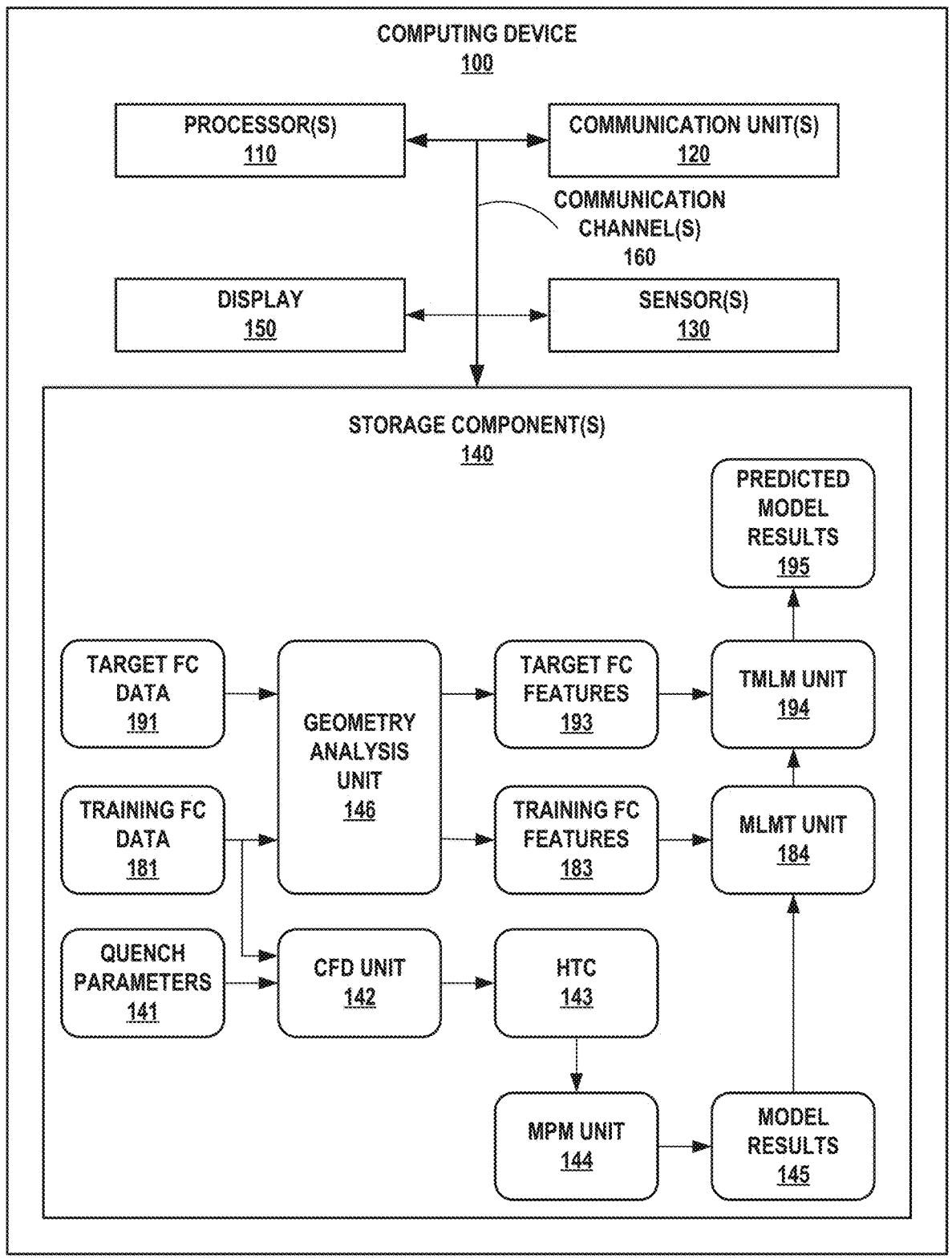
FIG. 1 is a block diagram illustrating an example computing device that is configured to perform predictive modeling for forged components in accordance with one or more aspects of the present disclosure.

FIG. 1 is a block diagram illustrating an example computing device that is configured to perform predictive modeling for forged components in accordance with one or more aspects of the present disclosure. FIG. 1 illustrates only one particular example of computing device 100, and many other examples of computing device 100 may be used in other instances and may include a subset of the components included in computing device 100 or may include additional components not shown in in the example of FIG. 1.

As shown in the example of FIG. 1, computing device 100 includes one or more processors 110, one or more communication unit(s) 120, one or more sensor(s) 130, one or more storage component(s) 140, a display 150. One or more processors 110 may represent hardware units (which may also be referred to as "hardware circuits" or "circuits," "circuitry," "digital circuits," or the like) configured to implement functionality and/or execute instructions associated with computing device 100. Examples of processors 110 include application processors, display controllers, auxiliary processors, one or more sensor hubs, and any other hardware configured to function as a processor, a processing unit, or a processing device, such as a field programmable gate array (FPGA), a central processing unit (CPU), a digital signal processor (DSP), an application specific integrated circuit (ASIC), a microcontroller, and the like. Processors 110 may retrieve and execute instructions stored by storage component(s) 140 that cause processors 110 to perform the operations described herein that are attributed to various software units described below in more detail. The instructions, when executed by processors 110, may cause computing device 100 to store information within storage component(s) 140.

One or more communication unit(s) 120 may represent hardware units configured to communicate with external devices via one or more wired and/or wireless networks by transmitting and/or receiving network signals on the one or more networks. Examples of communication unit(s) 120 include a network interface card (e.g., an Ethernet card), an optical transceiver, a radio frequency transceiver, a GPS receiver, or any other type of device that can send and/or receive information. Other examples of communication unit(s) 120 may include short wave radios, cellular data radios, wireless network radios, as well as universal serial bus (USB) controllers.

One or more sensor(s) 130 may represent hardware units configured to receive input. Examples of sensor(s) 130 include, but are not limited to, a capacitive touchscreen, a projective capacitive touchscreen, a resistive touchscreen, a surface acoustic wave touchscreen, a camera, a microphone, a button, a switch, an accelerometer, a gyroscope, a barometer, a magnetometer, a radar, etc. Sensor(s) 130 may receive input, such as radio wave input, in conjunction with communication unit(s) 120 (e.g., a UWB interface, a personal area network (PAN) interface, a global positioning system (GPS) receiver, a radar detector, etc.).

One or more storage component(s) 140 may represent hardware units configured to store information for processing during operation of computing device 100. In some examples, storage component(s) 140 is a temporary memory, meaning that a primary purpose of storage component(s) 140 is not long-term storage. Storage component(s) 140 on computing device 100 may be configured for short-term storage of information as volatile memory and therefore may not retain stored contents if powered off. Examples of volatile memories include random-access memories (RAM), dynamic random-access memories (DRAM), static random-access memories (SRAM), and other forms of volatile memories known in the art.

Storage component(s) 140, in some examples, may also represent hardware units configured to include one or more computer-readable storage media. Storage component(s) 140, in some examples, include one or more non-transitory computer-readable storage mediums. Storage component(s) 140 may be configured to store larger amounts of information than typically stored by volatile memory. Storage component(s) 140 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Display 150 may represent a hardware unit configured to present a user interface, such as a graphical user interface, a command line interface, or any other type of user interface with which a user of computing device 100 may interact to provide and receive data. Examples of display 150 may include a liquid crystal display (LCD), dot matrix display, light emitting diode (LED) display, micro light emitting diode (micro-LED) display, quantum light emitting diode (QLED) display, organic light emitting diode (OLED) display, e-ink, or similar monochrome or color display capable of outputting visible information to a user of computing device 100. In some examples, display 150 may integrate one or more sensors 130 (although both are shown separately in the example of FIG. 1 for ease of illustration purposes), whereupon display 150 may represent a presence-sensitive display, which may be referred to as a touchscreen or other type of display with which a user may interact directly (e.g., via a finger) or indirectly (e.g., via a stylus or other type of input device).

Communication channel(s) 160 interconnect each of the components 110-150 for inter-component communications (physically, communicatively, and/or operatively). In some examples, communication channel(s) 160 may include a system bus, a memory bus, a network connection, an inter-process communication data structure, or any other inter-unit communication medium for communicating data.

As further shown in the example of FIG. 1, storage component(s) 140 may store program instructions (which may be referred to as software or software units) and/or information (e.g., data) associated with a computational fluid dynamics (CFD) unit 142 and a materials and process modeling (MPM) unit 144. CFD unit 142 and MPM unit 144 may model a quenching process as applied to a forged component. Because hot forging and the quenching process applied to hot forged components is a complicated and involved process, various models, such as CFD unit 142 and MPM unit 144, have been developed to facilitate development of forged components to reduce an amount of trial and error (and accompanying waste of time and material) to successfully develop a forged component that meets specified tolerances for use in production.

CFD unit 142 may model heat transfer to better understand how quenching will impact the hot forged component. CFD unit 142 may apply partial differential equations (PDEs) to solve a mathematical model of how the fluid dynamics may facilitate transfer of heat from the hot forged component to the quenching medium (which may also be referred to as the "quenchant"). A mechanical finite element method (FEM) model may utilize the output of the CFD model to produce data representative of location-specific quench impacts on the hot forged component. MPM unit 144 may represent an example of the mechanical FEM model, which may produce a stress analysis based on the thermal analysis performed by CFD unit 142.

That is, CFD unit 142 may represent a software unit configured to perform CFD based on quench parameters 141 to obtain various properties regarding data representative of a forged component (such as training forged component—FC—data 181). CFD unit 142 may process training FC data 181 according to quench parameters 141 to produce heat transfer coefficients. As CFD is a very complicated process to model at an atomic level, CFD unit 142 may perform CFD at an intermediate level by dividing the surface of the forged component (which may refer to the data representative of the geometry of the forged component) into various zones. CFD unit 142 may then model heat transfer for each zone to provide a number of different heat transfer coefficients.

CFD unit 142 may thereby approximate the quenching process, which may vary based on quench parameters 141 and a geometry of the forged component. Quench parameters 141 may include an orientation of the forged component in a quench tank, a size of the quench tank, an extent of agitation provided in the quench tank, a quench medium (e.g., water, oil, air, etc.), a rate of flow of the quench medium during introduction of the quench medium, a rate of flow of the quench medium during extraction of the quench medium, a rate at which the forged component is introduced to the quench tank, a rate at which the forged component is extracted from the quench tank, whether the quenching process is continuous or interrupted, and any other parameter that may impact the quenching process. The data representative of the forged component may include an image of the forged component, a wireframe of the forged component, a type of material used for the forged component (e.g., steel, iron, etc.), a scale for the forged component (e.g., an indication of a size of the forged component) and any other data representative of the forged component required for application of CFD.

Any changes to quench parameters 141 or the geometry of the forged component (as represented by training FC data 181) may change the model results (e.g., cracking or other quench distortions) produced by MPM unit 144. That is, CFD unit 142 may produce different HTC 143 that potentially differ greatly when either one or both of the quench parameters 141 and training FC data 181 are changed, which in turn results in MPM unit 144 calculating different model results 145 (e.g., a location specific indication of transient stresses that may result in cracking).

While modeling may reduce application of quenching that results in unsuitable forged components, such modeling may be time consuming, especially when there are a number of different potential geometries for a given forged component, each of which must be separately modeled. In addition, each forge may have different quenching configurations that very greatly between one another, which may result in each forge and/or customer having to repeat such modeling for each quench configuration.

In accordance with various aspects of the techniques described in this disclosure, computing device 100 may leverage machine learning to predict how the quenching process performed according to various quenching parameters 141 may impact a hot forged component. Computing device 100 may obtain a trained machine learning model (TMLM) that has been trained using model results output from past quench modeling of forged components having a variety of different geometries. The TMLM may associate the model results to the underlying different geometries of each of the forged components. In some instances, the association learned by the TMLM may involve a mapping of HTC 143 to features (which may be extracted via a principal component analysis or by way of a convolutional neural network) representative of the underlying different geometries of each of the forged components.

Computing device 100 may then obtain data representative of a target forged component design having a target geometry that differs from the geometries of the forged components used to train the machine learning model. Computing device 100 may extract the features of the target geometry for the target forged component, providing the extracted features of the target geometry for the target forged component as an input to the TMLM. The TMLM may, upon receiving the extracted features of the target geometry for the target forged component, identify one or more of the training forged components having a similar (e.g., a sum of differences between the extracted features for the target forged component and the extracted features for the training forged components within a set threshold) geometry or partial geometry. The TMLM may then assign model results for the similar geometries (or partial geometries) for the training forged components to the target geometry (or partial target geometry) for the target forged component, thereby potentially avoiding the need to perform extensive modeling for the target forged component.

In operation, computing device 100 may store training FC data 181 to storage components 140. Computing device 100 may next invoke CFD unit 142, whereupon processors 110 may execute CFD unit 142 to apply the CFD process to training FC data 181 in order to model a quenching process having various quench parameters 141. CFD unit 142 may iterate through a number of different training FC data 181, where each instance of training FC data 181 may represent a forged component having a different geometry. For each iteration of training FC data 181 representative of a forged component having a different geometry, CFD unit 142 may output HTC 143.

Computing device 100 may next invoke MPM unit 144, where processors 110 may execute MPM unit 144 to process HTC 143 to identify one or more mechanical properties of the forged component (such as transient stresses that may result in cracking or other quench distortions, such as warping, uneven hardness, etc.). MPM unit 144 may process HTC 143 to generate such model results 145 that represent the one or more mechanical properties.

Computing device 100 may also invoke a geometry analysis unit 146, which processors 110 may execute to extract training FC features 183 from training FC data 181. Geometry analysis unit 146 may perform principal component analysis (PCA) with respect to training FC data 181 to extract training FC features 183 in the form of principal component coefficients. In addition or as an alternative to PCA, geometry analysis unit 146 may apply a convolutional neural network (CNN) to training FC data 181 to extract training FC features 183 in the form of a feature map. As such, training FC features 183 may include one or both of principal component coefficients and/or the feature map.

As further shown in the example of FIG. 1, storage devices 140 may also store a machine learning model training (MLMT) unit 184 that processors 110 may invoke to train a machine learning model (MLM) to associate model results 145 to training FC features 183. The trained MLM (TMLM) may represent a neural network, a random forest model, a linear regression model, a support vector machine, a Naïve Bayes model, or any other form of machine learning model capable of associating model results 145 to training FC features 183. MLMT unit 184 may output the TMLM for use in predicting model results as discussed in more detail below, where the TMLM is shown in the example of FIG. 1 as TMLM unit 194.

In some instances, TMLM unit 194 may associate training FC features 183 to model results 145 in a non-linear manner. For example, assuming training FC features 183 represents principal component coefficients, the TMLM may associate a particular component (which may represent a basis function) to a particular set (or possibly subset) of model results 145, whereupon the TMLM may scale or otherwise adjust the set (or possibly subset) of model results 145 based on the principal component coefficient associated with the underlying component. As such, a set of principal component coefficients may be associated with multiple subsets of model results 145, which are scaled or otherwise predicted at least in part based on the principal component coefficient values.

In any event, computing device 100 may store TMLM unit 194 that associates training FC features 183 representative of forged components having respective a different geometry of a number of different geometries to training model results 145 representative of one or more mechanical properties (e.g., tensile strength) generating through modeling application of a quench process to training FC data 181 according to quench parameters 141. In addition, computing device 100 may store target FC data 191 representative of a target FC having a target geometry that differs from all of the geometries for training FC data 181.

In order to apply TMLM unit 194, computing device 100 may first transform target FC data 191 into the feature domain. That is, computing device 100 may invoke geometry analysis unit 146, providing target FC data 191 as an input to geometry analysis unit 146. Geometry analysis unit 146 may perform a geometrical analysis with respect to the target FC data 191 to extract target FC features 193. Geometrical analysis unit 193 may perform a similar analysis as that described above with respect to training FC data 181 in order to extract target FC features 193, such as the above described PCA or application of the CNN.

After transforming target FC data 191 into the feature domain as target FC features 193, computing device 100 may invoke TMLM unit 194, providing target FC features 193 as an input. TMLM unit 194 may process target FC features 193 to predict model results 195 from model results 145 for geometries (or possibly partial geometries) of training FC data 191 having a similar geometry to the target geometry. Predicted model results 195 may represent predicted results from modeling application of quench process to target FC data 191 according to quench parameters 141, but without the computational complexity associating with application of CFD unit 142 and MPM unit 144. Computing device 100 may then output predicted model results 195.

In this way, various aspects of the techniques may facilitate more efficient operation of computing device 100 itself. By allowing computing device 100 to predict model results through application of TMLM unit 194, computing device 100 may consume less resources (e.g., processor cycles, memory, memory bus bandwidth, and accompanying power) compared to performing a full modeling (involving computational fluid dynamics and mechanical finite element method processes) with respect to each variation of the geometry for potential target forged components (e.g., as represented by target FC data 191). Moreover, as full modeling may consume significant amounts of time, computing device 100 that processes target geometries for forged components using TMLM unit 194 may rapidly prototype different geometries and possibly identify geometries that would perform better than accepted existing geometries, leading to development of better geometries for target forged components.

While displayed as part of a single device in the example of FIG. 1, components of computing device 100 may, in some examples, be located within and/or as part of different devices. For instance, in some examples, some of or all the functionality of CFD unit 142, MPM unit 144, geometry analysis unit 146, MLMT unit 184, and TMLM unit 194 may be located at the same or different computing systems. That is, in some examples, techniques of the present disclosure may be performed and utilized by a single computing device, while, in other examples, the techniques may be performed and/or utilized across a plurality of computing systems, such as a distributed or "cloud" computing system.

For example, although shown as performing both training and application of TMLM unit 194, computing device 100 may output TMLM unit 194 to another computing device, which is not shown in the example of FIG. 1 for ease of illustration purposes. That is, TMLM unit 194 may represent a standalone unit that can be invoked by any computing device, including computing devices that do not have access to model results 145 and/or training FC features 183 for purposes of training TMLM unit 194.

Figure 2:
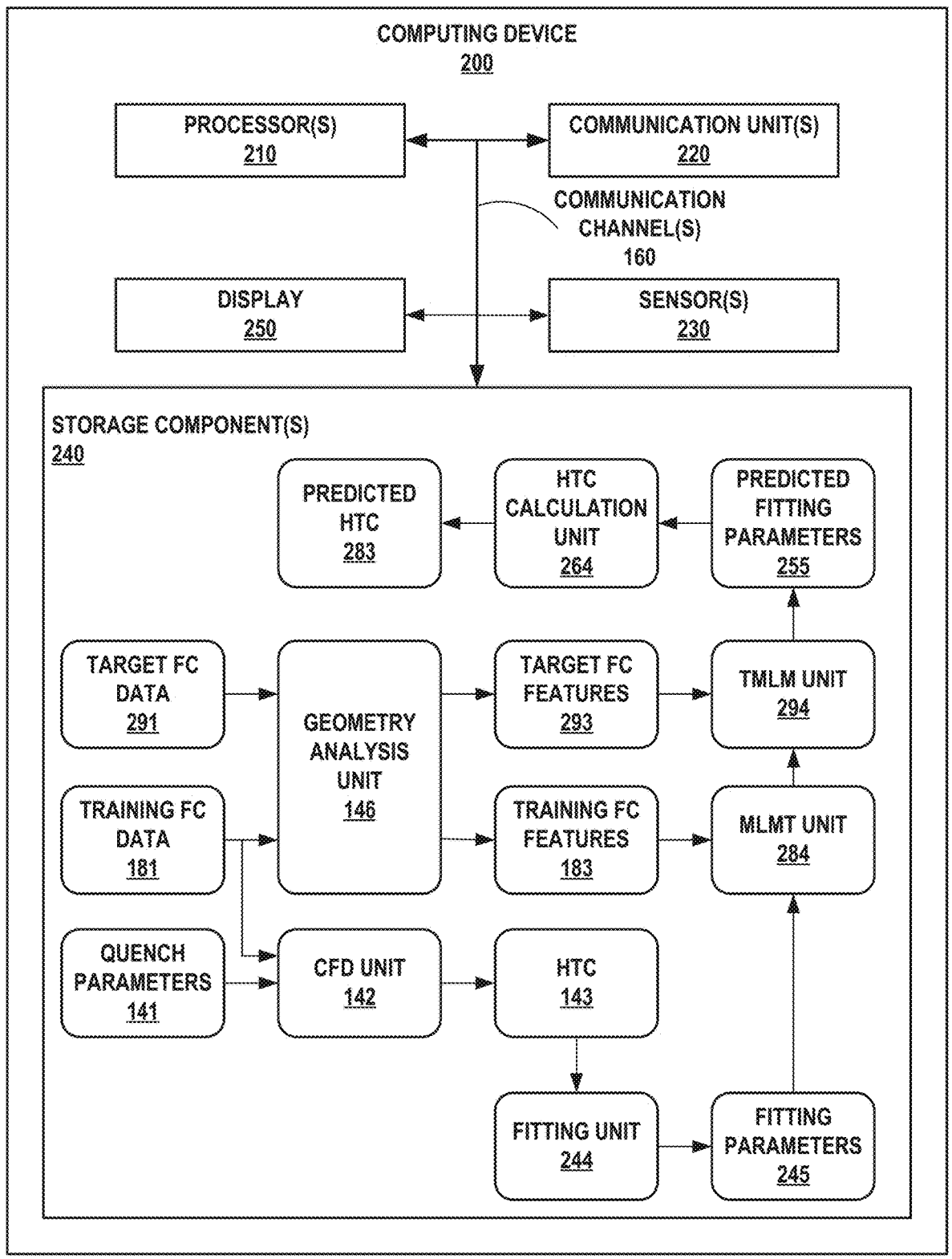
FIG. 2 is a block diagram illustrating another example computing device that is configured to perform predictive modeling for forged components in accordance with one or more aspects of the present disclosure.

FIG. 2 is a block diagram illustrating another example computing device that is configured to perform predictive modeling for forged components in accordance with one or more aspects of the present disclosure. FIG. 1 illustrates only one particular example of computing device 200, and many other examples of computing device 200 may be used in other instances and may include a subset of the components included in computing device 200 or may include additional components not shown in in the example of FIG. 2.

As shown in the example of FIG. 2, computing device 200 may be similar to computing device 100 shown in the example of FIG. 1 in that computing device 200 includes one or more processors 210, one or more communication unit(s) 220, one or more sensor(s) 230, one or more storage component(s) 240, a display 250. Processors 210 may be similar if not substantially the same as processors 110. Communication units 220 may be similar if not substantially the same as communication units 120. Sensors 230 may be similar if not substantially the same as sensors 130. Storage components 240 may be similar if not substantially the same as storage components 140. Display 250 may be similar to if not substantially the same as display 150.

However, computing device 200 implements a different algorithm by which to predict HTC for target FC data 291 when target FC data 291 represents a geometry that is substantially different from training FC data 181 (e.g., where differences—such as a sum of differences—between target FC data 291 and training FD data 181 are above some threshold value when compared in the feature space). In the example of FIG. 2, storage components 240 stores a CFD unit 142, which models application of a quench process to training FC data 181 according to quench parameters 141 as described above. CFD unit 142 outputs, as a result of modeling the quench process, HTC 143 again as described above.

In the example of FIG. 2, storage component 240 stores a fitting unit 244 rather than MPM unit 142. Processors 210 may invoke fitting unit 244, providing HTC 143 as an input to fitting unit 244. Fitting unit 244 may represent a unit configured to fit HTC 143 to a model representative of HTC 143. As noted above, CFD unit 143 may generate HTC 143 over temperature for a number of different geometrical zones of each training FC data 141. Fitting unit 244 may fit each of these curves of HTC 143 over temperature to a model that approximates HTC 143 across all of the zones, providing an abstraction of HTC 143 for each training FC data 141 that can be represented by three variables denoted as 'A,' 'B,' and 'C' in the following equation:

$$HTC = A*\sin(B + C*T^2)$$

In the above equation, the variable HTC represents a distinct set of HTC 143 for training FC data 141 representative of a single forged component (of the set of forged components represented by training FC data 141). The variable A denotes an amplitude of the HTCs fit across all of the HTC 143 curves over temperature. The variables B and C denote fixed constants for a particular quench process (alloy, quench temperature, quench media—or in other words—type of quenchant, etc.). The variable T denotes temperature. Fitting unit 244 may fit HTC 143 using the forgoing equations to produce fitting parameters 245 (which may include the values for variables A, B, and C).

Storage component 240 also stores, in the example shown in FIG. 2, geometry analysis unit 146, which operates similarly to the geometry analysis unit 146 of computing device 100 to process training FC data 181 in order to obtain training FC features 183. Geometry analysis unit 146 of computing device 100 may also perform a geometrical analysis with respect to target FC data 291 to obtain target FC features 293.

Storage component 240 may also store an MLMT unit 284, which operates in a manner similar than that described above with respect to MLMT unit 184, but associates model results in the form of, at least in part, fitting parameters 245 to training FC features 183. The model results, in other words, may include fitting parameters 245 that model HTC 143 for a particular geometry of a forged component represented by training FC data 181. MLMT unit 284 may produce a TMLM that associates a particular feature of training FC features 183 to a value for fitting parameters 245. MLMT unit 284 may output the TMLM as TMLM unit 294.

Processors 210 may invoke TMLM unit 294, providing target FC features 293 as an input to TMLM unit 294. TMLM unit 294 may, process target FC features 293, to identify training FC features 183 having a least sum of differences in the feature space, whereupon TMLM unit 294 may predict based on differences between target FC features 293 and training FC features 183 to generate predicted fitting parameters 255. Predicted fitting parameters 255 may include values for the variables A, B, and C specified in the above equation, which may represent one example of predicted model results.

In addition, storage component 240 may store HTC calculation unit 264, which processors 210 may invoke to compute predicted HTC 283 from predicted fitting parameters 255. That is, HTC 283 may receive, as an input, predicted fitting parameters 255 and apply the fitting model (as represented, in this example, by the equation set forth above) to predicted fitting parameters 255 to obtain predicted HTC 283. Computing device 200 may then output predicted HTC 283 (as predicted model results) via display 250 or via other outputs (e.g., a removable storage device, via communication unit 220, etc.).

A user or other operator of computing device 200 may review predicted HTC 283 to determine whether the target forge component represented by target FC data 291 should undergo further modeling, such as that performed by CFD unit 142 and MPM unit 144 to predict likely residual stresses on the target forged component design. In this way, computing device 200 may identify potential geometries for target FC data 291 that should also undergo further full modeling (or should be modified prior to full modeling), which may then be used to train the TMLM to further improve prediction.

Figure 3:
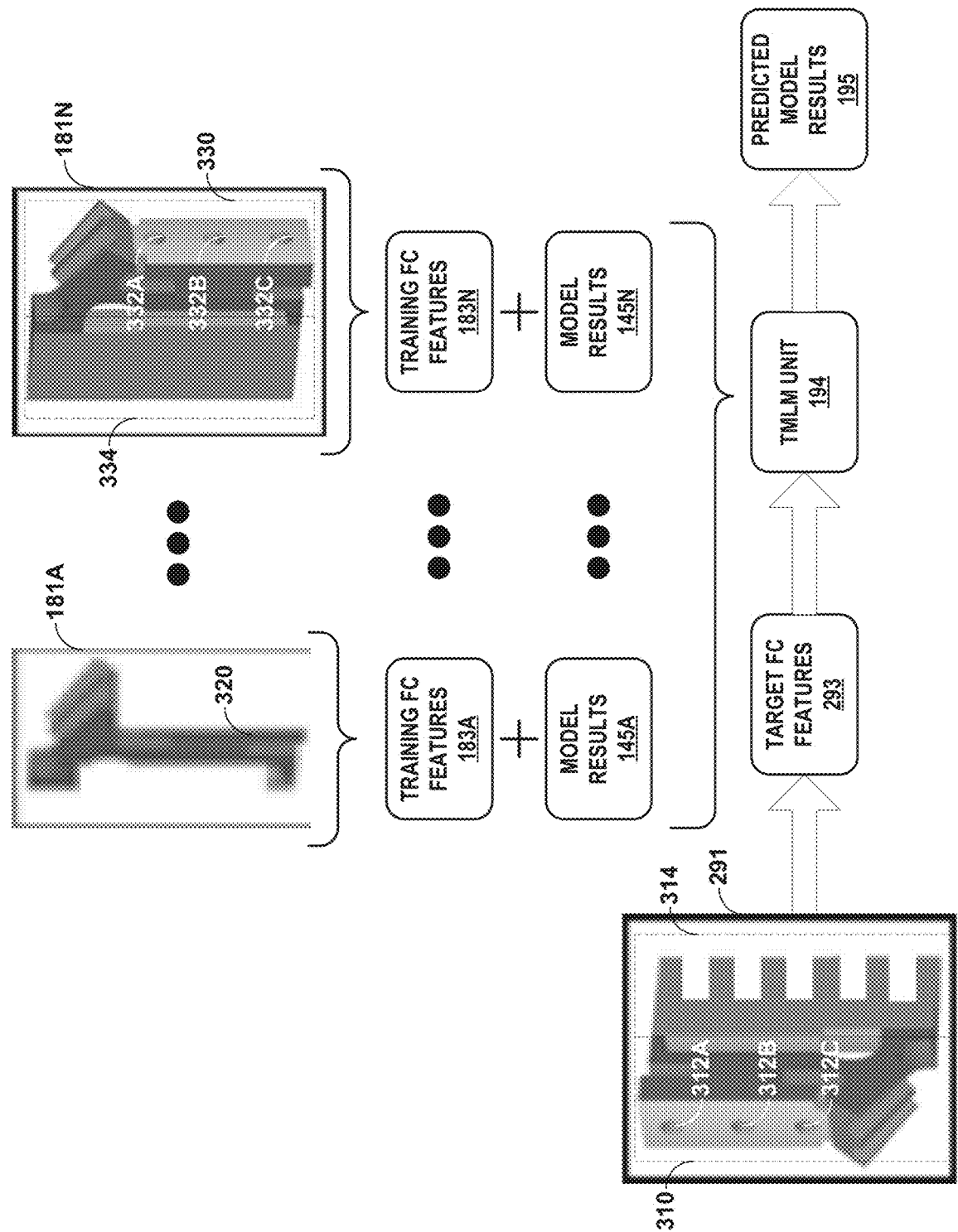
FIG. 3 is a diagram illustrating example operations of computing device of FIG. 1 in performing various aspects of the predictive modeling techniques described in this disclosure.

FIG. 3 is a diagram illustrating example operations of computing device 100 in performing various aspects of the predictive modeling techniques described in this disclosure. In the example of FIG. 3, target FC data 191 is shown as an image (and may be denoted as "target FC image 191") in which a production geometry 310 has plugs 312A-312C ("plugs 312") and is backed by a flanged pot 316.

Processors 110 may invoke geometry analysis unit 386 to extract target FC features 193 from target FC image 191. Processors 110 may next invoke TMLM unit 194 to process target FC image 191 to obtain predicted model results 195, as described above.

TMLM unit 194, as further shown in the example of FIG. 3, may be trained using training FC data 181A-181N ("training FC data 181"), which again are shown as images and may, as a result, be denoted as "training FC images 181"). To facilitate training, geometry analysis unit 186 may extract training FC features 183A-183N from each training FC image 181. Geometry analysis unit 186 may, in this respect, transform training FC images 181 from the spatial domain to the feature domain. In addition, modeling is performed with respect to each training FC image 181 in which CFD unit 182 and MPM unit 184 process training FC image 181 (and possible other data) to generate model results 145A-145N ("model results 145") for each training FC image 181. TMLM unit 194 may be trained to fuse or otherwise associate training FC features 183 to model results 145.

In the example of FIG. 3, training FC image 181A includes production geometry 320 without any plugs, and having a thinner profile than production geometry 310. In addition, production geometry 320 is inverted with respect to production geometry 310. Training FC image 181N includes production geometry 330 having plugs 332A-332C ("plugs 332") that is inverted with respect to production geometry 310. In addition, production geometry 330 is backed (or, in other words, coupled) to a continuous pot 334 (meaning, it is not flanged).

Various training FC features 183 may represent each of the foregoing aspects (e.g., production geometry 320/330, plugs 332, and pot 334). Training of TMLM unit 194 may involve associating each of training FC features 183 to model results 145, which may in effect associate various geometries (as represented by training FC features 183) to model results 145 for a particular location at that corresponding geometry. TMLM unit 194 may identify training FC features 183 that are closest to the target FC features 193 (in terms of a sum of differences between a location of training FC features 183 to a location of target FC features 193 in the feature space). TMLM unit 194 may next extrapolate from model results 145 mapped to the closest training FC features 183 to associate extrapolated model results 145 to various locations along target FC features 193. TMLM unit 194 may output these extrapolated model results as predicted model results 195.

Figure 4:
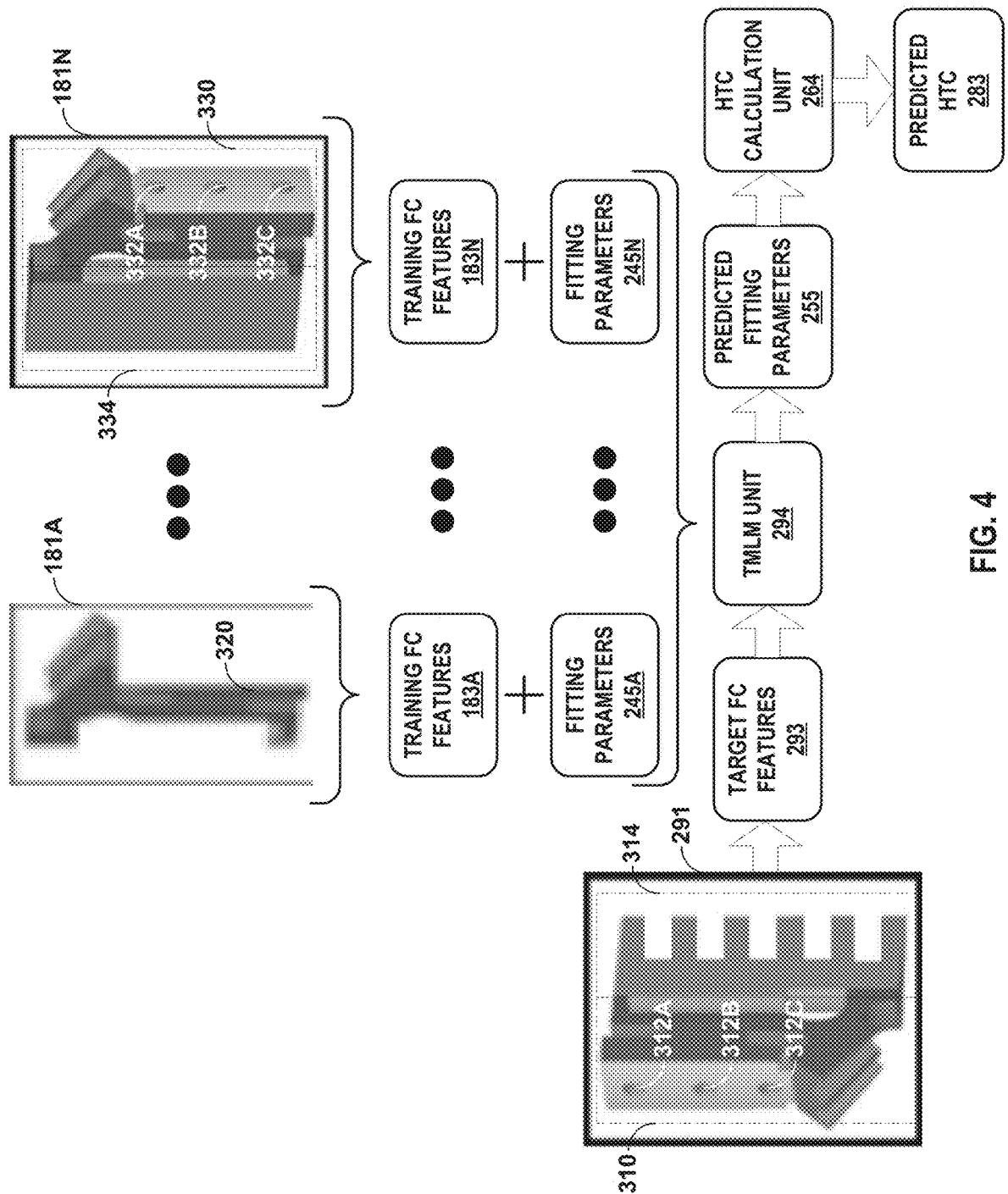
FIG. 4 is a diagram illustrating example operations of the computing device of FIG. 3 in performing various aspects of the predictive modeling techniques described in this disclosure.

FIG. 4 is a diagram illustrating example operations of the computing device of FIG. 3 in performing various aspects of the predictive modeling techniques described in this disclosure. In the example of FIG. 4, target FC data 291 is shown as an image (and may be denoted as "target FC image 291") in which a production geometry 310 has plugs 312A-312C ("plugs 312") and is backed by a flanged pot 316.

Processors 210 may invoke geometry analysis unit 386 to extract target FC features 293 from target FC image 291. Processors 210 may next invoke TMLM unit 294 to process target FC image 291 to obtain predicted fitting parameters 255, whereupon processors 210 invoke HTC calculation unit 264 to compute, based on predicted fitting parameters, predicted HTC 283, as described in more detail above.

TMLM unit 294, as further shown in the example of FIG. 4, may be trained using training FC data 181A-181N ("training FC data 181"), which again are shown as images and may, as a result, be denoted as "training FC images 181"). To facilitate training, geometry analysis unit 186 may extract training FC features 183A-183N from each training FC image 181. Geometry analysis unit 186 may, in this respect, transform training FC images 181 from the spatial domain to the feature domain. In addition, modeling is performed with respect to each training FC image 181 in which CFD unit 182 produces HTC 185, which are fit to the fitting model by fitting unit 286 to produce fitting parameters 245A-245N for each training FC image 181. TMLM unit 194 may be trained to fuse or otherwise associate training FC features 183 to fitting parameters 245.

In the example of FIG. 4, training FC image 181A includes production geometry 320 without any plugs, and having a thinner profile than production geometry 310. In addition, production geometry 320 is inverted with respect to production geometry 310. Training FC image 181N includes production geometry 330 having plugs 332A-332C ("plugs 332") that is inverted with respect to production geometry 310. In addition, production geometry 330 is backed (or, in other words, coupled) to a continuous pot 334 (meaning, it is not flanged).

Various training FC features 183 may represent each of the foregoing aspects (e.g., production geometry 320/330, plugs 332, and pot 334). Training of TMLM unit 294 may involve associating each of training FC features 183 to fitting parameters 245, which may in effect associate various geometries (as represented by training FC features 183) to fitting parameters 245 for a particular location at that corresponding geometry. TMLM unit 294 may identify training FC features 183 that are closest to the target FC features 293 (in terms of a sum of differences between a location of training FC features 183 to a location of target FC features 293 in the feature space). TMLM unit 294 may next extrapolate from fitting parameters 245 mapped to the closest training FC features 293 to associate extrapolated fitting parameters 245 to various locations along target FC features 293. TMLM unit 294 may output these extrapolated model results as predicted fitting parameters 255.

Figure 5:
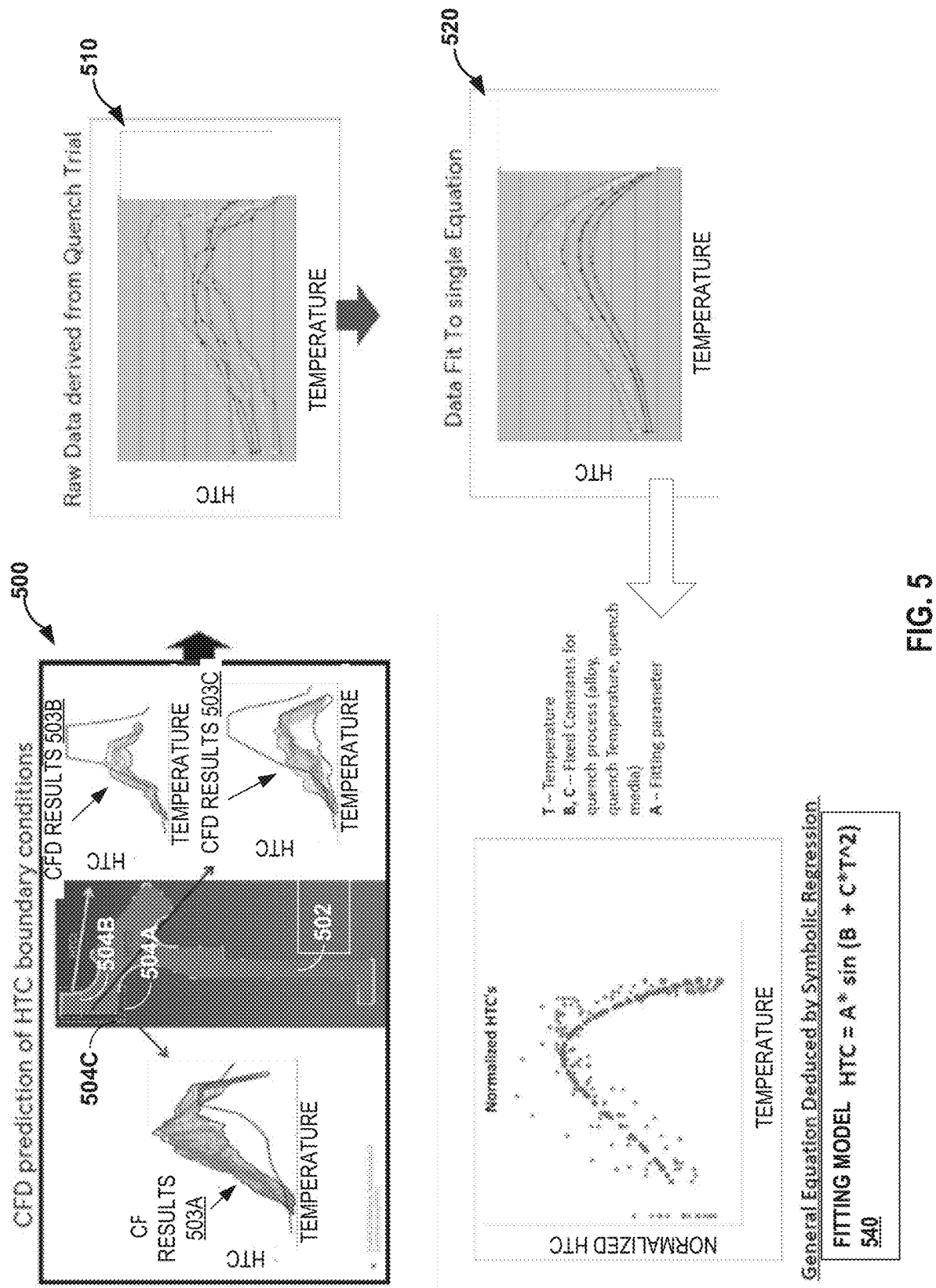
FIG. 5 is a diagram illustrating example formulation of the fitting unit shown in FIG. 2 to obtain fitting parameters in accordance with various aspects of the predictive modeling techniques described in this disclosure.

FIG. 5 is a diagram illustrating example formulation of the fitting unit shown in FIG. 2 to obtain fitting parameters in accordance with various aspects of the predictive modeling techniques described in this disclosure. In the example of FIG. 5, a diagram 500 illustrates processing of training FC data 502 by CFD unit 184 to obtain CFD results 503A-503C for different respective geometrical zones 504A-504C of training FC data 502. CFD unit 184 may obtain CFD prediction of HTC boundary conditions, outputting such predictions as CFD results 503A-503C.

After obtaining diagram 500, CFD results 503A-503C may be presented in graph 510 along with a number of other CFD results for different zones (e.g., 10 additional zones, which are then fit to a single equation as shown in graph 520. From graph 520, the HTC are then normalized and mapped to a single equation, which is shown in graph 530 as $HTC=A*\sin(B+C*T^2)$. This equation may form fitting model 540, which fitting unit 284 may apply to HTC in order to identify fitting parameters 245. HTC calculation unit 264 may apply this same fitting model 540 in order to predict HTC 283 from predicted fitting parameters 255.

Although described as being used to identify fitting parameters in terms of the variable A, fitting model 540 may be used to identify values for variables B and C when given HTC values and varying the values for variables A, B, and C. Solving for variables B and C may facilitate identification of quench parameters 141 when HTC values are provided by forges (which may not release quench parameters 141 or allow independent testing). As such, fitting model 540 may enable determination of whether the quenching process was performed (or, in this case, modeled) according to quench parameters 141 or different quench parameters. Once different quench parameters are identified (or, otherwise, reverse engineered), the different quench parameters may be used to model the new quench process to understand how the new quench process may impact the forged components having the different geometries.

Figure 6:
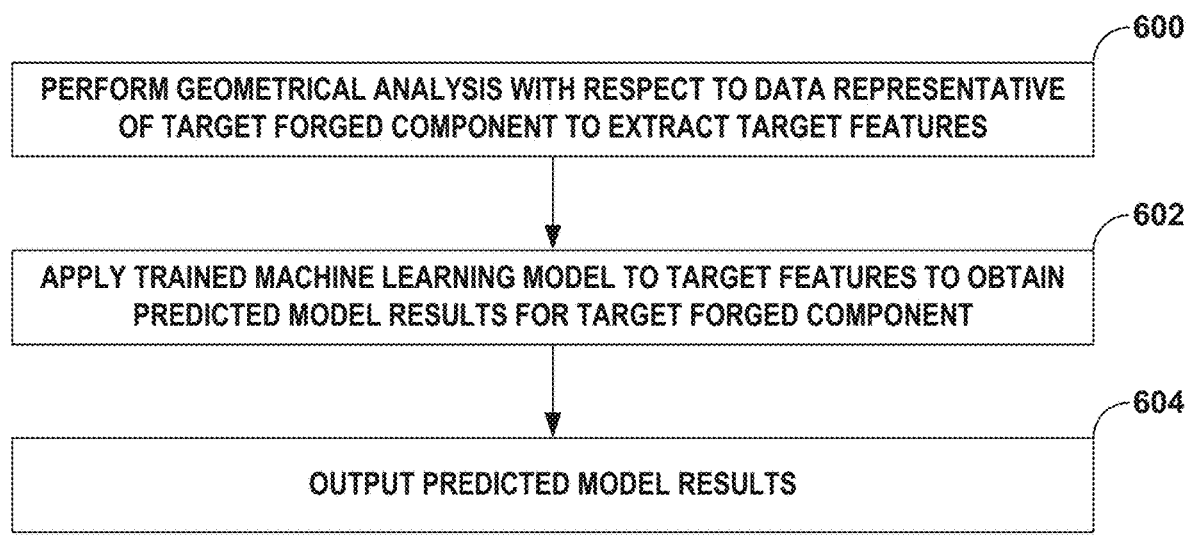
FIG. 6 is a flowchart illustrating example operation of computing devices shown in the example of FIGS. 1 and 2 in performing various aspects of the predictive modeling techniques described in this disclosure.

FIG. 6 is a flowchart illustrating example operation of computing device shown in the example of FIG. 1 in performing various aspects of the predictive modeling techniques described in this disclosure. Although described with respect to computing device 100 shown in the example of FIG. 1, various aspects of the techniques may also enable computing device 200 shown in the example of FIG. 2 to perform the following operation related to predictive modeling for forged components as described in more detail above.

In any event, computing device 100 may first perform a geometrical analysis with respect to target FC data 191 to extract target FC features 193 (600). Processors 110 of computing device 100 may invoke a geometry analysis unit 146 to extract target FC features 193 from target FC data 191, thereby transforming target FC data 191 into the feature domain from the spatial domain. Geometry analysis unit 146 may perform such geometrical analysis through PCA or via application of a CNN, where such target FC features 193 may refer to principal component coefficients (in the case of PCA) and/or a feature map (in the case of CNN).

After transforming target FC data 191 into the feature domain as target FC features 193, processors 110 may next invoke TMLM unit 194, which applies a trained machine learning model to target FC features 193 to obtain predicted model results 195 (602). Processors 110 may next output predicted model results 195 (604), which an operator of computing device 100 may review in order to determine whether actual modeling of a quenching process having quench parameters 141 should be performed with respect to target FC data 191.

As such, various aspects of the techniques may be represented by the clauses listed below.

Clause 1. A computing device comprising: a memory configured to: store a trained machine learning model that associates training features extracted from data representative of a plurality of training forged components having a respective different geometry of a plurality of geometries to a plurality of training model results representative of one or more mechanical properties generated through modeling application of a quench process to the plurality of training forged components according to quench parameters; and store data representative of a target forged component having a target geometry that differs from all of the plurality of geometries for the plurality of training forged components; and one or more processors configured to: perform a geometrical analysis with respect to the data representative of the target forged component to extract target features; apply the trained machine learning model to the target features to obtain predicted model results for the target forged component, the predicted model results representative of modeling application of the quench process to the data representative of the target forged component according to the quench parameters; and output the predicted model results.

Clause 2. The computing device of clause 1, wherein the predicted model results identify a quench distortion for the target forged component as a function of location over the target geometry.

Clause 3. The computing device of clause 2, wherein the quench distortion includes one or more of a tensile strength, a transient stress, and a microstructure.

Clause 4. The computing device of any combination of clauses 1-3, wherein the plurality of modeling results are obtained via application of: computational fluid dynamics to the data representative of the plurality of training forged components having the plurality of geometries in order to obtain heat transfer coefficients as a function of location over the plurality of geometries; and materials and process modeling to the heat transfer coefficients to obtain the plurality of model results for one or more mechanical properties of each of the plurality of training forged components during the quenching process performed according to the quench parameters.

Clause 5. The computing device of any combination of clauses 1-4, wherein the training features extracted from the data representative of the plurality of training forged components include training principal component coefficients representative of each of the plurality of geometries, and wherein the one or more processors are, when configured to perform the geometrical analysis, configured to perform principal component analysis with respect to the data representative of the target forged component having the target geometry to obtain target principal component coefficients representative of the target geometry of the target forged component, and wherein the one or more processors are configured to, when applying the trained machine learning model, apply the trained machine learning model to the target principal component coefficients representative of the target geometry of the target forged component to obtain the predicted model results.

Clause 6. The computing device of any combination of clauses 1-5, wherein the features extracted from the data representative of the plurality of training forged components include training feature maps extracted through application of a convolutional neural network to the data representative of the plurality of training forge components, wherein the one or more processors are, when configured to perform the geometrical analysis, configured to apply the convolutional neural network to the data representative of the target forged component having the target geometry to obtain a target feature map representative of the target geometry of the target forged component, and wherein the one or more processors are configured to, when applying the trained machine learning model, apply the trained machine learning model to the target feature map representative of the target geometry of the target forged component to obtain the predicted model results.

Clause 7. The computing device of any combination of clauses 1-6, wherein the one or more processors are further configured to: obtain model data representative of a training forged component of the plurality of training forged components; and apply the trained machine learning model to the model data representative of the training forged component of the plurality of forged components having a different geometry of the plurality of geometries to determine whether the quenching process was performed according to the one or more quenching parameters or a different one or more quenching parameters.

Clause 8. The computing device of any combination of clauses 1-7, wherein the plurality of modeling results are obtained via application of: computational fluid dynamics to the data representative of the plurality of training forged components having the plurality of geometries in order to obtain heat transfer coefficients as a function of location over the plurality of geometries; and a fitting model to the heat transfer coefficients as a function of location over the plurality of geometries in order to obtain fitting parameters, wherein the plurality of modeling results include the fitting parameters.

Clause 9. The computing device of clause 8, wherein the one or more processors are configured, when applying the trained machine learning model, to: apply the trained machine learning model to the target features to obtain predicted fitting parameters for the target forged component; and apply the fitting model to the predicted fitting parameters to obtain the predicted model results as predicted heat transfer coefficients for the target forged component.

Clause 10. The computing device of any combination of clauses 1-9, wherein the data representative of the target forged component includes one or more of an image of the target forged component and a three-dimensional framework of the target forged component.

Clause 11. A method comprising: performing a geometrical analysis with respect to data representative of a target forged component to extract target features; applying a trained machine learning model to the target features to obtain predicted model results for the target forged component, the predicted model results representative of modeling application of a quench process to the data representative of the target forged component according to quench parameters, wherein the trained machine learning model associates training features extracted from data representative of a plurality of training forged components having a respective different geometry of a plurality of geometries to a plurality of training model results representative of one or more mechanical properties generated through modeling application of the quench process to the plurality of training forged components according to the quench parameters, and wherein the target forged component having a target geometry that differs from all of the plurality of geometries for the plurality of training forged components; and outputting the predicted model results.

Clause 12. The method of clause 11, wherein the predicted model results identify a quench distortion for the target forged component as a function of location over the target geometry.

Clause 13. The method of clause 12, wherein the quench distortion includes one or more of a tensile strength, a transient stress, and a microstructure.

Clause 14. The method of any combination of clauses 11-13, wherein the plurality of modeling results are obtained via application of: computational fluid dynamics to the data representative of the plurality of training forged components having the plurality of geometries in order to obtain heat transfer coefficients as a function of location over the plurality of geometries; and materials and process modeling to the heat transfer coefficients to obtain the plurality of model results for one or more mechanical properties of each of the plurality of training forged components during the quenching process performed according to the quench parameters.

Clause 15. The method of any combination of clauses 11-14, wherein the training features extracted from the data representative of the plurality of training forged components include training principal component coefficients representative of each of the plurality of geometries, wherein performing the geometrical analysis comprises performing principal component analysis with respect to the data representative of the target forged component having the target geometry to obtain target principal component coefficients representative of the target geometry of the target forged component, and wherein applying the trained machine learning model comprises applying the trained machine learning model to the target principal component coefficients representative of the target geometry of the target forged component to obtain the predicted model results.

Clause 16. The method of any combination of clauses 11-15, wherein the features extracted from the data representative of the plurality of training forged components include training feature maps extracted through application of a convolutional neural network to the data representative of the plurality of training forge components, wherein performing the geometrical analysis comprises applying the convolutional neural network to the data representative of the target forged component having the target geometry to obtain a target feature map representative of the target geometry of the target forged component, and wherein applying the trained machine learning model comprises applying the trained machine learning model to the target feature map representative of the target geometry of the target forged component to obtain the predicted model results.

Clause 17. The method of any combination of clauses 11-16, further comprising: obtaining model data representative of a training forged component of the plurality of training forged components; and applying the trained machine learning model to the model data representative of the training forged component of the plurality of forged components having a different geometry of the plurality of geometries to determine whether the quenching process was performed according to the one or more quenching parameters or a different one or more quenching parameters.

Clause 18. The method of any combination of clauses 11-17, wherein the plurality of modeling results are obtained via application of: computational fluid dynamics to the data representative of the plurality of training forged components having the plurality of geometries in order to obtain heat transfer coefficients as a function of location over the plurality of geometries; and a fitting model to the heat transfer coefficients as a function of location over the plurality of geometries in order to obtain fitting parameters, wherein the plurality of modeling results include the fitting parameters.

Clause 19. The method of clause 18, wherein applying the trained machine learning model includes: applying the trained machine learning model to the target features to obtain predicted fitting parameters for the target forged component; and applying the fitting model to the predicted fitting parameters to obtain the predicted model results as predicted heat transfer coefficients for the target forged component.

Clause 20. A non-transitory computer-readable storage medium having instructions stored thereon that, when executed, cause one or more processors to: perform a geometrical analysis with respect to data representative of a target forged component to extract target features; apply a trained machine learning model to the target features to obtain predicted model results for the target forged component, the predicted model results representative of modeling application of a quench process to the data representative of the target forged component according to quench parameters, wherein the trained machine learning model associates training features extracted from data representative of a plurality of training forged components having a respective different geometry of a plurality of geometries to a plurality of training model results representative of one or more mechanical properties generated through modeling application of the quench process to the plurality of training forged components according to the quench parameters, and wherein the target forged component having a target geometry that differs from all of the plurality of geometries for the plurality of training forged components; and output the predicted model results.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the computing device of FIGS. 1 and/or 2 may perform a method or otherwise comprise means to perform each step of the method for which the computing device of FIGS. 1 and/or 2 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the computing device of FIGS. 1 and/or 2 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A computing device comprising:
   a memory; and
   one or more processors configured to:
   extract training features from data representative of a plurality of surface geometry zones for a plurality of training forged components, wherein each training forged component from the plurality of training forged components is associated with data representative of a respective subset of surface geometry zones from the plurality of surface geometry zones;
   for each training forged component:
   obtain a plurality of computational fluid dynamics results for the respective subset of geometry zones by modeling application of a quench process to the respective training forged component according to quench parameters, wherein each geometry zone from the respective subset of geometry zones is associated with a respective subset of computational fluid dynamics results from the plurality of computational fluid dynamics results; and determine, based on the plurality of computational fluid dynamics results, a respective model for identifying a respective set of fitting parameters;

obtain, based on each respective set of fitting parameters, a plurality of training model results representative of one or more mechanical properties;

store, in the memory, a trained machine learning model that associates the training features to the plurality of training model results;

store, in the memory, data representative of a target forged component having a target surface geometry zone that differs from all of the plurality of surface geometry zones for the plurality of training forged components;

perform a geometrical analysis with respect to the data representative of the target forged component to extract target features;

apply the trained machine learning model to the target features to obtain predicted model results for the target forged component, the predicted model results representative of the application of the quench process to the target forged component according to the quench parameters; and output the predicted model results.

2. The computing device of claim 1, wherein the predicted model results identify a quench distortion for the target forged component as a function of location over the target surface geometry zone.

3. The computing device of claim 2, wherein the quench distortion includes one or more of a tensile strength, a transient stress, and a microstructure.

4. The computing device of claim 1, wherein to obtain the plurality of training model results, the one or more processors are further configured to:

obtain a respective set of heat transfer coefficients as a function of location over the respective subset of surface geometry zones, wherein the respective set of fitting parameters is identified based on the respective set of heat transfer coefficients; and apply materials and process modeling to each respective set of fitting parameters to obtain the plurality of training model results.

5. The computing device of claim 1, wherein the training features extracted from the data representative of the plurality of surface geometry zones for the plurality of training forged components include training principal component coefficients representative of each of the plurality of surface geometry zones, wherein the one or more processors are, when configured to perform the geometrical analysis, configured to perform principal component analysis with respect to the data representative of the target forged component having the target surface geometry zone to obtain target principal component coefficients representative of the target surface geometry zone of the target forged component, and wherein the one or more processors are configured to, when applying the trained machine learning model, apply the trained machine learning model to the target principal component coefficients representative of the target surface geometry zone of the target forged component to obtain the predicted model results.

6. The computing device of claim 1, wherein the features extracted from the data representative of the plurality of surface geometry zones for the plurality of training forged components include training feature maps extracted through application of a convolutional neural network to the data representative of the plurality of surface geometry zones for the plurality of training forge components, wherein the one or more processors are, when configured to perform the geometrical analysis, configured to apply the convolutional neural network to the data representative of the target forged component having the target surface geometry zone to obtain a target feature map representative of the target surface geometry zone of the target forged component, and wherein the one or more processors are configured to, when applying the trained machine learning model, apply the trained machine learning model to the target feature map representative of the target surface geometry zone of the target forged component to obtain the predicted model results.

7. The computing device of claim 1, wherein the one or more processors are further configured to:

obtain model data representative of a training forged component of the plurality of training forged components; and apply the trained machine learning model to the model data representative of the training forged component of the plurality of forged components to determine whether the quenching process was performed according to the quench parameters or different quench parameters.

8. The computing device of claim 1, wherein to obtain the plurality of training model results, the one or more processors are further configured to:

obtain a respective set of heat transfer coefficients as a function of location over the respective subset of surface geometry zones; and apply a fitting model to each respective set of heat transfer coefficients as a function of location over the respective subset of surface geometry zones in order to obtain the respective set of fitting parameters, wherein the plurality of training model results include all of the sets of fitting parameters.

9. The computing device of claim 8, wherein the one or more processors are configured, when applying the trained machine learning model, to:

apply the trained machine learning model to the target features to obtain predicted fitting parameters for the target forged component; and apply the fitting model to the predicted fitting parameters to obtain the predicted model results as predicted heat transfer coefficients for the target forged component.

10. The computing device of claim 1, wherein the data representative of the target forged component includes one or more of an image of the target forged component and a three-dimensional framework of the target forged component.

11. A method comprising:

extracting training features from data representative of a plurality of surface geometry zones for a plurality of training forged components, wherein each training forged component from the plurality of training forged components is associated with data representative of a respective subset of surface geometry zones from the plurality of surface geometry zones;

for each training forged component:
obtaining a plurality of computational fluid dynamics results for the respective subset of geometry zones by modeling application of a quench process to the respective training forged component according to quench parameters, wherein each geometry zone from the respective subset of geometry zones is associated with a respective subset of computational fluid dynamics results from the plurality of computational fluid dynamics results; and determining, based on the plurality of computational fluid dynamics results, a respective model for identifying a respective set of fitting parameters;

obtaining, based on each respective set of fitting parameters, a plurality of training model results representative of one or more mechanical properties;

storing, in a memory, a trained machine learning model that associates the training features to the plurality of training model results;

storing, in the memory, data representative of a target forged component having a target surface geometry zone that differs from all of the plurality of surface geometry zones for the plurality of training forged components;

performing a geometrical analysis with respect to the data representative of the target forged component to extract target features;

applying the trained machine learning model to the target features to obtain predicted model results for the target forged component, the predicted model results representative of an application of a quench process to the target forged component according to quench parameters; and outputting the predicted model results.

12. The method of claim 11, wherein the predicted model results identify a quench distortion for the target forged component as a function of location over the target surface geometry zone.

13. The method of claim 12, wherein the quench distortion includes one or more of a tensile strength, a transient stress, and a microstructure.

14. The method of claim 11, wherein obtaining the plurality of training model results further comprises:
obtaining a respective set of heat transfer coefficients as a function of location over the plurality respective subset of surface geometry zones, wherein the respective set of fitting parameters is identified based on the respective set of heat transfer coefficients; and
applying materials and process modeling to each respective set of fitting parameters to obtain the plurality of training model results.

15. The method of claim 11,
wherein the training features extracted from the data representative of the plurality of surface geometry zones for the plurality of training forged components include training principal component coefficients representative of each of the plurality of surface geometry zones,
wherein performing the geometrical analysis comprises performing principal component analysis with respect to the data representative of the target forged component having the target surface geometry zone to obtain target principal component coefficients representative of the target surface geometry zone of the target forged component, and wherein applying the trained machine learning model comprises applying the trained machine learning model to the target principal component coefficients representative of the target surface geometry zone of the target forged component to obtain the predicted model results.

16. The method of claim 11,
wherein the features extracted from the data representative of the plurality of surface geometry zones for the plurality of training forged components include training feature maps extracted through application of a convolutional neural network to the data representative of the plurality of surface geometry zones for the plurality of training forge components,
wherein performing the geometrical analysis comprises applying the convolutional neural network to the data representative of the target forged component having the target surface geometry zone to obtain a target feature map representative of the target surface geometry zone of the target forged component, and
wherein applying the trained machine learning model comprises applying the trained machine learning model to the target feature map representative of the target surface geometry zone of the target forged component to obtain the predicted model results.

17. The method of claim 11, further comprising:
obtaining model data representative of a training forged component of the plurality of training forged components; and
applying the trained machine learning model to the model data representative of the training forged component of the plurality of forged components to determine whether the quenching process was performed according to the quench parameters or different quench parameters.

18. The method of claim 11, wherein obtaining the plurality of training model results further comprises:
obtaining a respective set of heat transfer coefficients as a function of location over the respective subset of surface geometry zones; and
applying a fitting model to each respective set of heat transfer coefficients as a function of location over the respective subset of surface geometry zones in order to obtain the respective set of fitting parameters, wherein the plurality of training model results include all of the sets of fitting parameters.

19. The method of claim 18,
wherein applying the trained machine learning model includes:
applying the trained machine learning model to the target features to obtain predicted fitting parameters for the target forged component; and
applying the fitting model to the predicted fitting parameters to obtain the predicted model results as predicted heat transfer coefficients for the target forged component.

20. A non-transitory computer-readable storage medium having instructions stored thereon that, when executed, cause one or more processors to:
extract training features from data representative of a plurality of surface geometry zones for a plurality of training forged components, wherein each training forged component from the plurality of training forged components is associated with data representative of a respective subset of surface geometry zones from the plurality of surface geometry zones;

for each training forged component:
  obtain a plurality of computational fluid dynamics results for the respective subset of geometry zones by modeling application of a quench process to the respective training forged component according to quench parameters, wherein each geometry zone from the respective subset of geometry zones is associated with a respective subset of computational fluid dynamics results from the plurality of computational fluid dynamics results; and
  determine, based on the plurality of computational fluid dynamics results, a respective model for identifying a respective set of fitting parameters;
obtain, based on each respective set of fitting parameters, a plurality of training model results representative of one or more mechanical properties;
store a trained machine learning model that associates the training features to the plurality of training model results;
store data representative of a target forged component having a target surface geometry zone that differs from all of the plurality of surface geometry zones for the plurality of training forged components;
perform a geometrical analysis with respect to the data representative of the target forged component to extract target features;
apply the trained machine learning model to the target features to obtain predicted model results for the target forged component, the predicted model results representative of an application of a quench process to the target forged component according to quench parameters; and
output the predicted model results.

* * * * *